Patented Nov. 4, 1924.

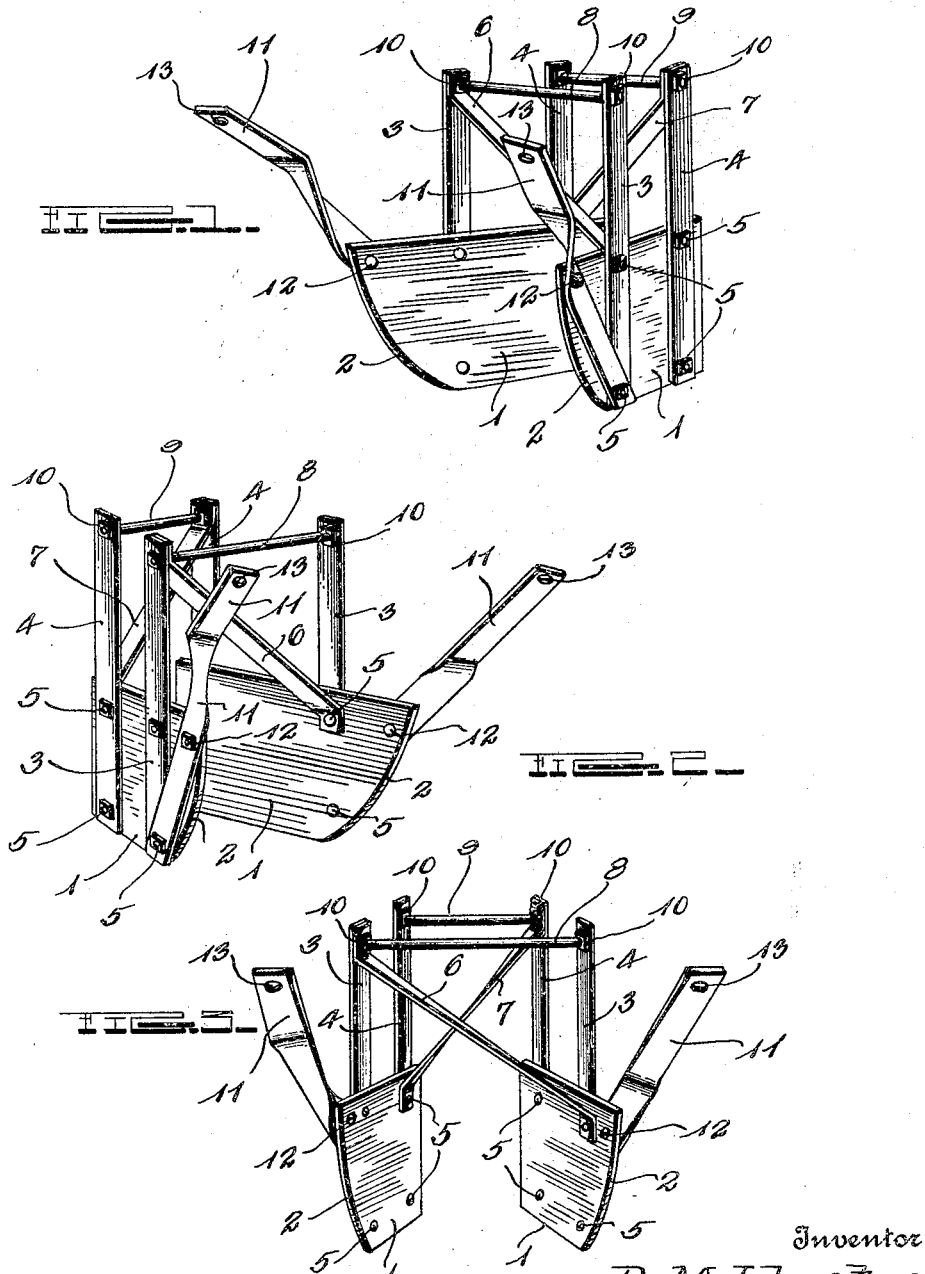

1,514,050

UNITED STATES PATENT OFFICE.

RICHARD M. JOHNSTON, OF WINCHESTER, ILLINOIS, ASSIGNOR OF ONE-HALF TO LOUIS ODEGARD, OF WINCHESTER, ILLINOIS.

CULTIVATOR FENDER.

Application filed February 2, 1924. Serial No. 690,227.

*To all whom it may concern:*

Be it known that I, RICHARD M. JOHNSTON, a citizen of the United States, residing at Winchester, in the county of Scott and State of Illinois, have invented certain new and useful Improvements in Cultivator Fenders; and I do declare the following to be a full, clear, and exact description of the invention, such as will enable others skilled in the art to which it appertains to make and use the same.

My invention relates to improvements in fenders for attachment to cultivators to prevent the latter from throwing earth upon small plants, the object of the invention being to provide an extremely simple and inexpensive, yet a highly efficient and desirable fender of the character set forth which may be easily attached to the arch of an ordinary wheeled cultivator.

With the foregoing in view, the invention resides in the novel subject matter hereinafter described and claimed, the description being supplemented by the accompanying drawing in which Figures 1, 2 and 3 are perspective views of a cultivator fender constructed in accordance with my invention.

In the drawings above briefly described, the numerals 1 designate a pair of forwardly diverging fender plates disposed in vertical planes and preferably having rounded front ends 2. Front and rear metal bars 3 and 4 rise rigidly from the fender plates 1 and extend across the outer sides thereof against which they are secured by appropriate bolts 5. A transverse brace bar 6 declines from the upper end of the front bar 3 of one fender plate 1, to the upper portion of the other fender plate to whose inner side it is secured by the adjacent bolt 5. A rear transverse brace bar 7 declines from the upper end of the rear bar 4 of said other fender plate to the upper portion of the first mentioned fender plate and is secured to the latter by one of the bolts 5. The upper ends of the bars 3 and 4 are connected by transverse tie-bolts 8 and 9 which pass through openings in the upper ends of said bars and the brace bars 6 and 7, being provided with nuts 10 for securing these parts in place.

A pair of inclined pull-bars 11 have their lower ends overlapped with the lower end portions of the front bars 3 and secured thereto by the adjacent bolts 5, said bars 11 being secured to the upper front corners of the plates 1 by bolts or the like 12. The upper ends of the bars 1 are provided with openings 13 for engagement with suitable fasteners whereby said arms may be connected with the arch of an ordinary wheeled cultivator, so that the fender plates 1 may straddle the row being cultivated, thereby preventing the cultivator from throwing earth onto the growing plants.

The construction shown is not only simple and inexpensive, but it is very rigid and durable, attention being directed to the fact that by having the bars 3, 4 and 11 secured against the outer sides of the plates 1, these plates are effectively reinforced and may therefore be formed of comparatively thin sheet metal. Furthermore, by employing the arrangement of braces 6 and 7 above described, it will be seen that taller plants may be cultivated without injury than if a pair of crossed brace rods or the like were provided both at the front and rear of the fender. If the plants are substantially as high as the front tie-bolt 8, the front inclined brace 6 will merely bow them laterally to a slight extent until they pass under said brace. Then, the rear brace 7 will merely bow the plants in the opposite direction in order to clear them.

As excellent results have been obtained from the details disclosed, they are preferably followed, but within the scope of the invention as claimed, numerous minor changes may be made.

I claim:

1. A cultivator fender comprising a pair of earth-engaging fender plates spaced apart horizontally, front and rear vertical bars rising rigidly from said fender plates, tie-members connecting the upper ends of said vertical bars and extending transversely between them, a pair of oppositely inclined brace bars having their lower ends secured to the upper portions of said fender plates, the upper end of one brace bar being secured to the upper end of the front vertical bar of one fender plate while the upper end of the other brace bar is secured to the upper end of the rear vertical bar of the other fender plate, and means for connecting said fender plates with a cultivator.

2. A structure as specified in claim 1; said tie members being in the form of bolts passing through the upper ends of said vertical bars and said brace bars, said bolts having nuts securing said vertical and brace bars in place thereon.

3. A structure as specified in claim 1; said vertical bars extending across the outer sides of said fender plates to reinforce the latter; said connecting means consisting of inclined pull bars overlapping the lower ends of said front vertical bars and secured to the front upper corners of said fender plates to further reinforce the latter.

In testimony whereof I have hereunto affixed my signature.

RICHARD M. JOHNSTON.